United States Patent [19]

Kelley

[11] Patent Number: 4,607,736

[45] Date of Patent: * Aug. 26, 1986

[54] MULTIPLE SPEED DRIVE SYSTEM

[75] Inventor: Reginald D. Kelley, Troy, Mich.

[73] Assignee: Force Control Industries, Inc., Fairfield, Ohio

[*] Notice: The portion of the term of this patent subsequent to Aug. 7, 2001 has been disclaimed.

[21] Appl. No.: 542,269

[22] Filed: Oct. 17, 1983

Related U.S. Application Data

[63] Continuation-in-part of Ser. No. 284,479, Jul. 17, 1981, Pat. No. 4,463,841.

[51] Int. Cl.⁴ ............................................. F16D 67/02
[52] U.S. Cl. ............................ 192/18 A; 192/0.098; 192/87.19; 192/91 A
[58] Field of Search ............. 192/18 A, 0.098, 58 C, 192/85 CA, 86, 87.17, 87.19, 91 A

[56] References Cited

U.S. PATENT DOCUMENTS

| | | | |
|---|---|---|---|
| 3,378,120 | 4/1968 | Miller et al. | 192/18 A |
| 3,638,773 | 2/1972 | Lewis et al. | 192/18 A |
| 3,835,971 | 9/1974 | Spanke et al. | 192/18 A |
| 3,924,715 | 12/1975 | Cory | 192/18 A |
| 4,226,318 | 10/1980 | Morgan | 192/85 CA |
| 4,458,794 | 7/1984 | Yater | 192/18 A |
| 4,463,841 | 8/1984 | Kelley | 192/18 A |

OTHER PUBLICATIONS

Reuland Multiple Drive Brochure, Reuland Electric Company.

Primary Examiner—George H. Krizmanich
Assistant Examiner—James J. Merek
Attorney, Agent, or Firm—Jacox & Meckstroth

[57] ABSTRACT

An oil shear clutch-brake unit includes a housing rotatably supporting an input shaft and an output shaft in axial alignment, and the housing encloses a set of interfitting clutch plates and discs for coupling the input shaft to the output shaft and a set of interfitting brake plates and discs for braking the output shaft. A nonrotating actuating member or piston is also enclosed within the housing and is actuated from a neutral position by springs and/or fluid for either clamping the clutch plates and discs or clamping the brake plates and discs. A cooling and lubricating oil is circulated within the housing and between the plates and discs, and the pressure of the fluid for actuating the piston is adjustable for selecting the torque transmitted through the clutch and brake. The output shaft of the clutch-brake unit drives the shaft of a high speed electric motor, and the input shaft is coupled to the output shaft of a gear reducer which mounts on the housing of the clutch-brake unit and is driven by a second electric motor. The assembly of the clutch-brake unit may be arranged in-line with the high speed motor with a direct coupling of the shafts, or the assembly may be located above the high speed motor with a belt drive coupling of the shafts. In one embodiment, a second annular piston is located within the housing and actuates stop pins which hold the first piston in the neutral position.

14 Claims, 5 Drawing Figures

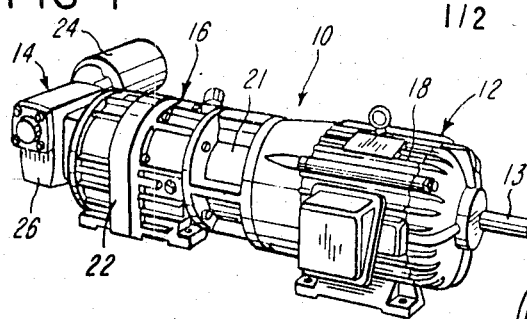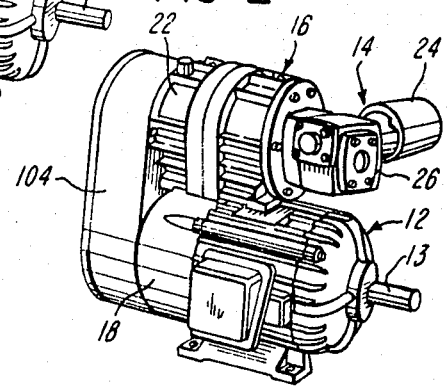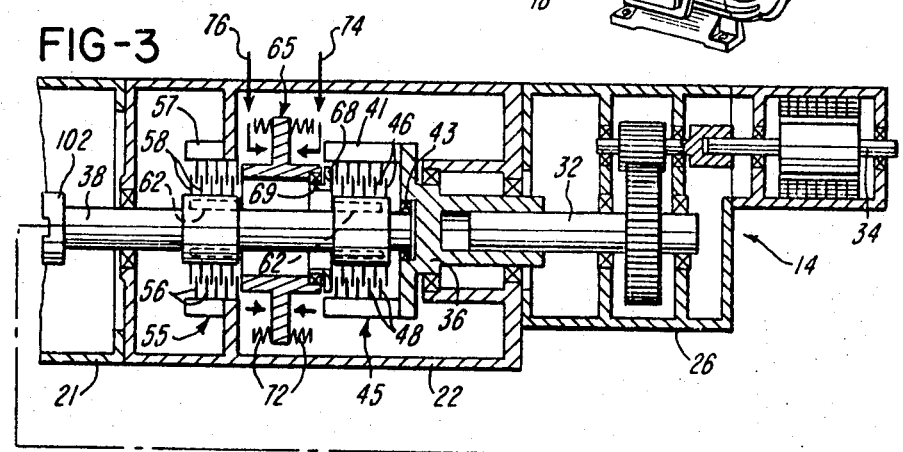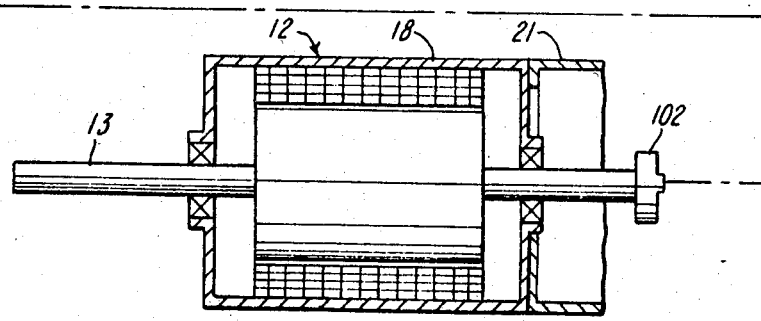

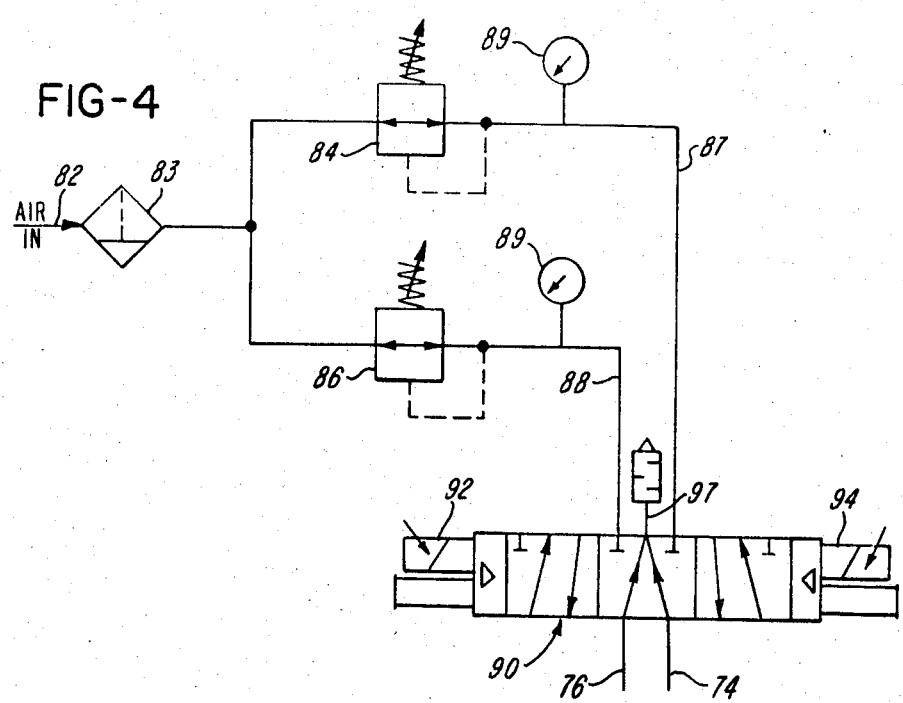
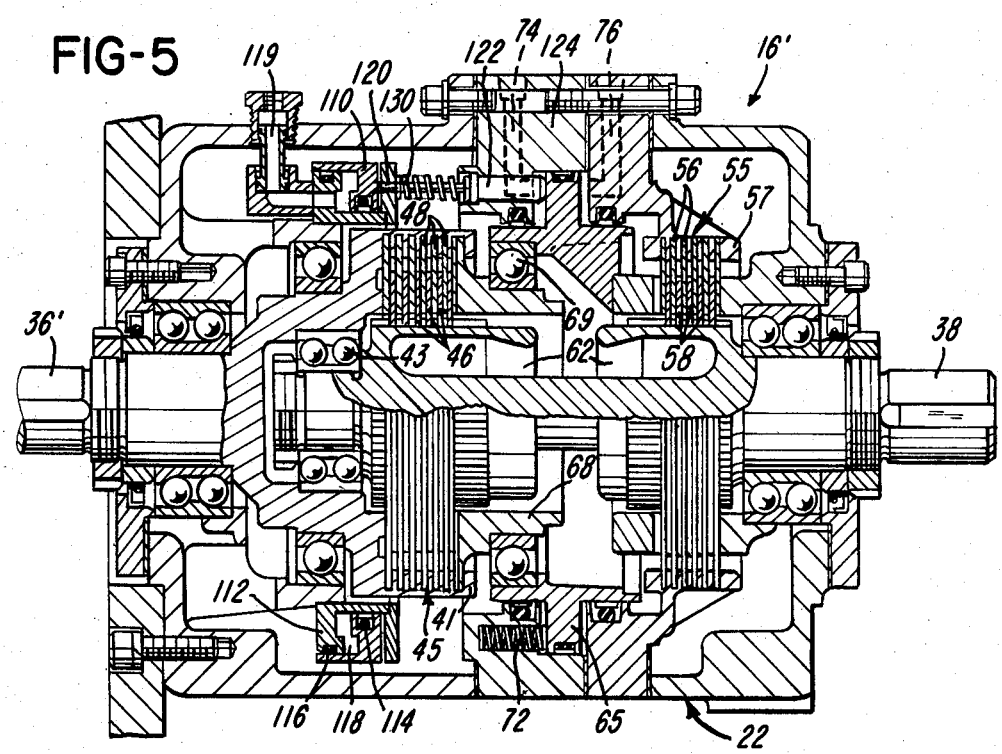

MULTIPLE SPEED DRIVE SYSTEM

RELATED APPLICATION

This application is a continuation-in-part of application Ser. No. 284,479, filed July 17, 1981, issued Aug. 7, 1984 as U.S. Pat. No. 4,463,841.

BACKGROUND OF THE INVENTION

In the field of multiple speed drive systems or units which are commonly used for driving equipment such as material handling equipment or workpiece transfer equipment or equipment for advancing and retracting a machine tool component, Reuland Electric Company of Howell, Mich. manufactures different models or units which are sold under the trademark REULAND. Another form of multiple or two-speed motor drive unit is manufactured in West Germany and sold in the United States by the Mannesmann Demag Corporation of Cleveland, Ohio under the trademark DEMAG. Commonly, such drive units have the same general construction and include a high speed or main electric motor and a slow speed electric motor-gear reducer unit which are coupled together through a clutch. In the REULAND drive, the clutch comprises an electromagnetic friction clutch, and in the DEMAG drive, the friction clutch is actuated by axial movement of the high speed motor shaft when the high speed motor is deenergized. In the REULAND drive, the output shaft of the main drive motor is braked by actuation of an electromagnetic friction brake surrounding the motor output shaft. In the DEMAG drive, the main motor output shaft is braked by actuating a brake surrounding the shaft of the slow speed drive motor and by also actuating the clutch which couples the high speed motor shaft to the slow speed motor-gear reducer unit.

For many applications of a two-speed motor drive unit, it has been found desirable to provide for continuous operation of the slow speed motor-gear reducer unit to obtain rapid cycling of the drive, and to provide for an extended operational life of the drive without requiring adjustment or disassembly to replace parts. It is also desirable to avoid transmission of the braking torque for the high speed motor shaft through the gear reducer unit and to provide for effective dissipation of the friction heat generated when the brake and clutch are actuated. It has also been found desirable for the drive unit to provide means for adjusting the torque applied through the brake to the high speed motor shaft as well as adjustment of the torque which is transferred through the clutch from the slow speed motor-gear reducer unit to the shaft of the high speed motor. In addition, it is highly desirable for a two-speed drive unit to be totally enclosed, especially when used in applications or on machinery where liquid such as a coolant or water splashes onto the drive unit. After carefully analyzing the commercially available two-speed drive units mentioned above, it is apparent that neither of the drive units provide all of the features desired on a multiple speed drive unit.

SUMMARY OF THE INVENTION

The present invention is directed to an improved multiple speed drive unit or system which provides all of the desirable features mentioned above, and which especially provides for a long and dependable service life with a minimum of maintenance, and which also provides for rapid cycling and precisely positioning a workpiece or tool component with optimum efficiency. The multiple speed drive unit of the invention is also of modular construction, incorporates self-adjusting and low inertia oil shear clutch and brake assemblies which effectively transfer friction heat and are externally adjustable.

In accordance with one embodiment of the invention, the above features and advantages are provided in a multiple speed motor drive system which incorporates a commercially available high speed or main electric motor and a commerically available slow speed electric motor-gear reducer unit. The output shaft of the slow speed motor-gear reducer unit and the output shaft of the high speed electric motor are coupled to opposite ends of an oil shear clutch-brake unit which has a housing having opposite end mounting faces. The housing of the clutch-brake unit rotatably supports an input drive member and an output drive member in axial alignment, and a series of interfitting oil shear brake plates and discs are positioned for braking the output shaft to the housing.

A similar set of oil shear clutch plates and discs are positioned within the housing to couple the input and output drive members, and a fluid and spring actuated piston is disposed for selectively clamping the brake plates and discs or the clutch plates and discs. The housing of the clutch-brake unit confines a lubricating and cooling oil which is pumped through both sets of plates and discs, and the actuating piston is held in a neutral or center position where neither the clutch or the brake is actuated. The input drive member of the clutch-brake unit is coupled to the output shaft of the slow speed motor-gear reducer unit, and the drive member of the clutch-brake unit is coupled to the high speed motor shaft.

The operation of the multiple speed motor drive system of the invention and other features and advantages of the invention will be apparent from the following description, the accompanying drawings and the appended claims.

BRIEF DESCRIPTION OF THE DRAWINGS

FIG. 1 is a perspective view of a multiple speed motor drive unit constructed in accordance with the invention;

FIG. 2 is a perspective view of a modified multiple speed motor drive unit also constructed in accordance with the invention;

FIG. 3 is a diagrammatic axial section of the drive unit shown in FIG. 1;

FIG. 4 is a diagram of the electro-pneumatic control system for the drive units shown in FIGS. 1 and 2; and FIG. 5 is an axial section of a clutch-brake unit adapted for use in either of the drives shown in FIGS. 1 and 2.

DESCRIPTION OF THE PREFERRED EMBODIMENTS

The multiple speed motor drive unit 10 illustrated in FIG. 1 is ideally suited for operating or driving machines which require a reversible fast speed drive and alternately, a slow speed drive. Such machines include, for example, article transfer machines, machine tool components and conveyors of different types. In general, the drive unit 10 is referred to as a "thrust package", but the unit may also be referred to as a mechanical feed system or way drive, a ballscrew or indexing drive or a positioning drive.

The drive unit 10 shown in FIG. 1 includes a main or high speed electric motor 12 having a rotor output shaft 13, a slow speed motor-gear reducer unit 14 and an oil shear clutch-brake unit 16 which is disposed between the high speed motor 12 and the low speed motor-gear reducer unit 14. The high speed motor 12 has a housing 18 which is connected by an annular coupling housing 21 to a housing 22 of the clutch-brake unit 16. The slow speed unit 14 includes an electric motor 24 and a gear reducer 26 which provides a substantial speed reduction, for example, with a 10 to 1 ratio.

Both of the motors 12 and 24 may have the same rated rpm, for example, 1725 rpm, and both the motor 12 and the motor reducer unit 14 have a standard NEMA "C" end surfaces or end mounting faces. As diagrammatically illustrated in FIG. 3, the slow speed motor-gear reducer unit 14 has an output shaft 32 which is driven by the motor shaft 34 through the gear reducer 26 illustrated in the form of a simple spur gear reducer. However, as illustrated in FIG. 1, the slow speed motor-gear reducer unit 14 may incorporate a worm type gear reducer, as commercially available from several different manufacturers.

The clutch-brake unit 16 is constructed as disclosed in U.S. Pat. No. 3,638,773 or No. 3,924,715 which issued to the assignee of the present invention, and preferably is constructed as shown in the latter U.S. Pat. No. 3,924,715. Thus the clutch-brake unit 16 has an input shaft 36 which is axially aligned with an output shaft 38, and both shafts are rotatably supported by the antifriction bearings retained by the housing 22. The input shaft 36 has an inner portion with angularly spaced lugs 41 and also retains an antifriction bearing 43 which supports the inner end of the output shaft 38.

A clutch 45 is provided for selectively coupling the input shaft 36 to the output shaft 38 and includes a plurality of annular clutch discs 46 which are connected by a spline to the output shaft 38 so that the discs rotate with the output shaft but are free to move axially relative to the output shaft. The clutch discs 46 are disposed in interfitting relation with a plurality of annular clutch plates 48 which are carried by the annularly spaced lugs 41 forming part of the input shaft 36.

The clutch-brake unit 16 also incorporates a brake 55 which includes a plurality of annular non-rotating brake plates 56 supported for axial movement by a set of annularly arranged stationary lugs 57 rigidly connected to the housing 22. A plurality of annular brake discs 58 are also splined to the output shaft 38 for rotation with the output shaft and are disposed in interfitting relation with the brake plates 56 and for axial movement relative to the output shaft. The housing 22 receives a supply of oil which is pumped or forced radially outwardly between the clutch plates and discs and between the brake plates and discs in response to rotation of oil flow ports (not shown) and impeller vanes 62 formed as part of the output shaft 38.

The clutch 45 and the brake 55 are alternately or selectively actuated in response to axial movement of an annular actuating member or piston 65 which is located between the clutch plates 48 and the brake plates 56. The piston 65 is supported for axial movement within a cylinder (not shown) formed as a part of the housing 22, and a rotary clutch actuating ring 68 is carried by the piston 65 through an anti-friction bearing 69. Preferably, the piston 65 is biased to a neutral or center position by a set of angularly arranged compression springs 72 located on opposite sides of the piston, and in this neutral position, neither the clutch 45 nor the brake 55 is engaged.

The piston 65 is of the double-acting type and is actuated or moved axially in response to fluid or air pressure exerted on either side of the piston by supplying pressurized air through an air line 74 or an air line 76. When it is desired to actuate the clutch 45 to couple the input shaft 36 to the output shaft 38, pressurized air is supplied through the line 76, and the line 74 is exhausted so that the piston 65 moves to the right (FIG. 3) and clamps the clutch discs 46 to the clutch plates 48. When it is desired to brake the output shaft 38 by actuating the brake 55, pressurized air is supplied through the air line 74, and the air line 76 is exhausted so that the piston 65 moves to the left (FIG. 3) and clamps the rotating brake discs 58 to the non-rotating brake plates 56.

Pressurized air is supplied to either the line 74 or the line 76 by a control system which is diagrammatically illustrated in FIG. 4. The pressurized air is supplied to the control system through a line 82 which is connected to an air compressor or an air supply tank. A filter 83 is installed within the line 82, and the filtered air is supplied to two adjustable pressure regulators 84 and 86. Air lines 87 and 88 are provided with gauges 89 and connect the regulators 84 and 86 to a three position, four-way double-actuated solenoid control valve 90 which has a brake actuating solenoid 92, a clutch actuating solenoid 94 and five ports. Four of the ports are connected to the air lines 74, 76, 87 and 88, and the fifth port is connected to an air exhaust line 97.

When it is desired to actuate the clutch 45, the clutch solenoid 94 is energized so that the valve 90 supplies pressure regulated air from the line 88 to the line 76, and the air line 74 is connected to the exhaust line 97, thereby pressurizing the left side of the piston 65 (FIG. 3). When it is desired to actuate the brake 55, the brake solenoid 92 is energized so that pressure regulated air is directed by the valve 90 from the line 87 to the line 74, and the air line 76 is connected to the exhaust line 97, thereby pressurizing the right side of the piston 65 (FIG. 3) of the clutch-brake unit 16.

FIG. 2 illustrates a modified multiple speed motor drive unit also constructed in accordance with the invention and wherein the slow speed motor-gear reducer unit 14 and the clutch-brake unit 16 are arranged above the high speed electric motor 12 instead of in axial alignment with the motor 12 as illustrated in FIG. 1. In the in-line assembly illustrated in FIG. 1, the output shaft 38 of the clutch-brake unit 16 is connected to the high speed motor shaft 13 by a flexible inline coupling 102 which is enclosed within the annular coupling housing 21. However, in the modification illustrated in FIG. 2, the output shaft 38 of the clutch-brake unit 16 is coupled to the high speed motor shaft 13 by a positive tooth-type belt drive (not shown) enclosed within a drive belt housing 104. Preferably, in both of the drive units illustrated in FIGS. 1 and 2, the housing 22 of the clutch-brake unit 16 is provided with either standard double-ended faces or surfaces which provide for conveniently coupling the clutch-brake unit 16 to the slow speed motor-gear reducer unit 14 and to the coupling housing 21 which also connects to the high speed motor housing 18 through standard NEMA "C" mounting surfaces or faces.

In a typical operation of the multiple speed motor drive unit illustrated in either FIGS. 1 or 2 to drive, for example, a feed screw, the slow speed motor 24 is preferably energized so that it operates continuously. When neither solenoid 92 or 94 are energized, both air lines 74 and 76 are connected to the exhaust line 97, as illustrated in FIG. 4, and the piston 65 remains in its neutral position as the result of the forces exerted by the compression springs 72. The main high speed motor 12 is energized to rotate the shaft 13 at the high speed, for example, to provide a rapid advance for the feed screw. At the end of the rapid advance, the main high speed motor 12 is deenergized, and the brake solenoid 92 is pulsed so that the brake 55 is momentarily energized. The shaft 13 is decelerated to a speed equal to or less than the slower speed of the continuously rotating shaft 32 of the slow speed motor gear-reducer unit 16. Immediately after the brake 55 is pulsed, the clutch solenoid valve 94 is energized so that the motor shaft 13 is coupled by the clutch 45 through the shaft 38 to the shaft 32. The shaft 13 and the feed screw are then driven at the slower or feed speed.

After the slower feed is completed, the clutch solenoid 94 is deenergized, and the brake solenoid 92 is energized so that the brake 55 is effective to brake the motor shaft 13 and the feed screw. As a result, the driven feed screw and load is brought to an accurate and repeatable stopping position from the slow speed mode of operation of the drive unit. When it is desired to reverse the shaft 13 and feed screw to provide a rapid return to the starting point, the brake 55 is released by deenergizing the brake solenoid 92, and the main high speed motor 12 is energized to drive the shaft 13 in a reverse direction. The brake 55 is then again energized to stop the shaft 13 and thereby complete the cycle.

FIG. 5 shows an axial section of a clutch-brake unit 16' which is constructed generally the same as the clutch-brake unit 16 described above in connection with FIGS. 1-3. Accordingly, FIG. 5 carries the same reference numbers for the components referred to above in the description of the clutch-brake unit 16. One modification of the clutch-brake unit 16' is that the input drive member or shaft 36' is shown solid in FIG. 5. However, the input shaft 36' may include a tubular portion such as the input drive member or shaft 36 or the shaft 36' may be connected to the output shaft 38 of the gear reducer 14 by a flexible coupling such as the coupling 102 or by a belt drive as mentioned above in connection with FIG. 2.

As shown in FIG. 5, a set of circumferentially spaced and axially extending compression springs 72 normally urge the annular actuating member or piston 65 towards a braking position for the output drive member or shaft 38 by engaging the brake 55 and forming what is commonly referred to as a spring set brake. Thus in the event fluid or air pressure to the clutch-brake unit fails, the springs 72 automatically engage the brake 55.

The clutch-brake unit 16' also incorporates an annular actuating member or piston 110 which is supported for axial sliding movement on an inner annular member or cylinder 112 secured to the housing 22. Resilient rings 114 and 116 form fluid-tight seals between the piston 110 and cylinder 112 and cooperate to define between the piston and cylinder a fluid-tight annular chamber 118. Pressurized fluid or air is supplied to the chamber 118 through an air supply passage 119.

A series of six circumferentially spaced and axially extending pins 120 extend from the annular piston 110 and include enlarged head portions 122 which are supported for axial sliding movement by an inwardly projecting portion 124 of the housing 22. As also shown in FIG. 5, the head portions 122 project axially from the housing section 124 into the chamber for the annular actuating member or piston 65 and form a stop for the piston in its neutral position when both the clutch 45 and the brake 55 are disengaged. Three of the pins 120 are surrounded by corresponding compression springs 130 which normally urge the corresponding head portions 122 to positions shown in FIG. 5 where the piston 65 is held in its neutral position.

In operation of the clutch-brake unit 16', normally the same fluid or air pressure is supplied to the passages 76 and 119 so that the piston 65 is held in its neutral position. When it is desired to engage the clutch 45, the supply passage 119 is exhausted and air is supplied to the passage 76 with sufficient pressure to overcome the resistance of the springs 72 and 130 so that the clutch discs 46 and clutch plates 48 are compressed together by the annular actuating member 68 for coupling the input drive member or shaft 36' to the output drive member or shaft 38. If it is desired to engage the brake 55 for stopping output drive member or shaft 38, the fluid or air supply passage 76 is exhausted, and the springs 72 are effective to engage the brake 55. If additional braking torque is desired, fluid or air pressure is supplied through the passage 74 for exerting an additional force against the piston 65 in the direction for actuating the brake 55. The passage 74 may be omitted if only a spring set brake is desired.

From the drawings and the above description, it is apparent that a multiple speed motor drive unit or system constructed in accordance with the invention provides desirable features and advantages. For example, the unit provides for rapid cycling operation and enables the slow speed motor-gear reducer unit 14 to be operated ocntinuously. The drive unit also provides for accurate control over the high speed and low speed rotation of the output shaft 13 of the unit. The oil shear clutch-brake unit 16 or 16' further provides for a long and dependable operation with minimum maintenance so that down-time of the machinery being operated by the drive unit is minimized. The neutral or center position of the actuating member or piston 65 also assures that both the clutch 45 and the brake 55 may not be simultaneously energized, and the pressure regulators 84 and 86 provide for precisely and conveniently selecting or adjusting the torque transmitted by the clutch 45 or the braking torque applied by the brake 55. The clutch-brake unit 16' provides not only for a neutral position but also for a spring set brake in the event the fluid supply pressure fails. When the unit 16' is provided with a passage 74, the unit also provides for conveniently increasing the braking torque exerted by the spring 72 by the addition of fluid pressure through the passage 74.

The circulation of the oil within the housing 22 of the clutch-brake unit 16 or 16' also provides for effectively dissipating the friction heat from the clutch 45 and the brake 55 and for dissipating the heat by rediation from the housing 22 or to a water cooling coil. The oil shear clutch 45 and brake 55 and the positive circulation of the oil further enable the drive unit of the invention to be used in applications where there is a high and/or rapid cycling requirement for example, when the drive unit is used on automatic assembly equipment.

While the forms of multiple speed drive herein described constitutes a preferred embodiment of the invention, it is to be understood that the invention is not limited to these precise forms, and that changes may be made therein without departing from the scope and spirit of the invention as defined in the appended claims.

The invention having thus been described, the following is claimed:

1. An oil shear clutch-brake unit including a housing adapted to contain a supply of oil, an input drive member and an output drive member supported for rotation within said housing on a common axis, means including a series of interfitting clutch plates and discs within said housing and arranged for selectively coupling said input drive member to said output drive member, means including a series of interfitting brake plates and discs within said housing and arranged for selectively braking said output drive member relatively to said housing, actuating means including a first non-rotating piston supported within said housing and movable axially between a clutch engaging position clamping said clutch plates and discs together and a brake engaging position clamping said brake plates and discs together and through a neutral position, said actuating means further including a plurality of circumferentially spaced and axially extending compression springs urging said first piston axially toward said brake engaging position, a second non-rotating piston disposed within said housing axially of said first piston, means responsive to movement of said second piston and forming a stop for positioning said first piston in said neutral position, and means for circulating oil within said housing outwardly between said clutch plates and discs and said brake plates and discs.

2. A clutch-brake unit as defined in claim 1 wherein said means forming a stop comprise a plurality of circumferentially spaced pins extending axially between said first piston and said second piston, and a compression spring surrounding each said pin and urging said pin towards a position forming said stop.

3. A multiple speed drive system comprising a first electric motor having a motor shaft with opposite first and second end portions, said second end portion being the output of said drive system, an oil shear clutch-brake unit including a housing adapted to contain a supply of oil, said unit further including an input drive member and an output drive member supported for rotation on a common axis, means including a series of interfitting clutch plates and discs within said housing and arranged for selectively coupling said input drive member to said output drive member, means including a series of interfitting brake plates and discs within said housing and arranged for selectively braking said output drive member relatively to said housing, actuating means including a non-rotating actuating member supported within said housing and movable axially between a clutch engaging position clamping said clutch plates and discs together and a brake engaging position clamping said brake plates and discs together and through a neutral position, said actuating means being effective to hold said actuating member in said neutral position and further including plurality of circumferentially spaced and axially extending compression springs urging said actuating member axially in a direction toward said neutral position and said brake engaging position, means connecting said output drive member of said clutch-brake unit to said first end portion of said shaft of said first electric motor, a second electric motor having a motor shaft, a gear reducer connecting said motor shaft of said second electric motor to said input drive member of said clutch-brake unit, and means for circulating oil within said housing outwardly between said clutch plates and discs and said brake plates and discs.

4. A drive system as defined in claim 3 wherein said actuating member comprises a fluid activated annular piston disposed within said housing of said clutch-brake unit, and means for holding said piston in said neutral position.

5. A drive system as defined in claim 3 wherein said actuating means further comprise a non-rotating annular piston disposed within said housing axially from said actuating member.

6. A drive system as defined in claim 5 wherein said actuating means further comprise a plurality of circumferentially spaced pins extending axially between said piston and said actuating member, and said pins are effective to form a stop for said actuating member in said neutral position when said piston is pressurized.

7. A drive system as defined in claim 6 and including a compression spring surrounding each said pin and urging said pin towards a position forming said stop.

8. A drive system as defined in claim 3 and including means for providing adjustable fluid pressure against said actuating member for supplementing said spring means in urging said actuating member towards said brake engaging position.

9. A drive system as defined in claim 5 and including means responsive to movement of said piston and forming a stop for positioning said actuating member in said neutral position.

10. A multiple speed motor drive system comprising a first electric motor having a motor shaft with opposite first and second end portions, said second end portion being the output of said drive system, an oil shear clutch-brake unit including a housing adapted to contain a supply of oil, said unit further including an input drive member and an output drive member supported for rotation on a common axis, means including a series of interfitting clutch plates and discs within said housing and arranged for selectively coupling said input drive member to said output drive member, means including a series of interfitting brake plates and discs within said housing and arranged for selectively braking said output drive member relatively to said housing, actuating means including a first non-rotating annular piston supported within said housing and movable axially between a clutch engaging position clamping said clutch plates and discs together and a brake engaging position clamping said brake plates and discs together and through a neutral position, said actuating means being effective to hold said piston in said neutral position and further including a plurality of circumferentially spaced and axially extending compression springs urging said piston axially in a direction toward said neutral position and said brake engaging position, means connecting said output drive member of said clutch-brake unit to said first end portion of said shaft of said first electric motor, a second electric motor having a motor shaft, a gear reducer connecting said motor shaft of said second electric motor to said input drive member of said clutch-brake unit, and means for circulating oil within said housing outwardly between said clutch plates and discs and said brake plates and discs.

11. A drive system as defined in claim 10 and including means for variably pressurizing said actuating member for axial movement in a direction toward said brake engaging position to provide for supplementing said springs and varying the braking torque applied to said output drive member.

12. A drive system as defined in claim 10 wherein said actuating means further comprise a second non-rotating annular piston disposed within said housing axially from said first non-rotating piston.

13. A drive system as defined in claim 12 wherein said actuating means further comprise a plurality of circumferentially spaced pins extending axially between said second piston and said first piston, and said pins are effective to form a stop for said first piston in said neutral position when said seocnd piston is pressurized.

14. A drive system as defined in claim 13 and including a compression spring surrounding each said pin and urging said pin towards a position forming said stop.

* * * * *